United States Patent [19]

Rohr

[11] 4,208,692
[45] Jun. 17, 1980

[54] METHOD AND APPARATUS FOR DETECTING FAULT CURRENTS IN ELECTRICAL NETWORKS

[75] Inventor: André Rohr, Chatelaine, Switzerland

[73] Assignee: BBC Brown, Boveri & Cie., Baden, Switzerland

[21] Appl. No.: 855,345

[22] Filed: Nov. 28, 1977

[30] Foreign Application Priority Data

Dec. 2, 1976 [CH] Switzerland ............... 15175/76

[51] Int. Cl.² .......................................... H02H 3/08
[52] U.S. Cl. ................................. 361/87; 361/110; 361/93
[58] Field of Search ............... 361/87, 93, 94, 110, 361/111, 78, 86; 328/142, 144, 145, 146; 307/293

[56] References Cited

U.S. PATENT DOCUMENTS

| 3,914,667 | 10/1975 | Waldron | 361/110 X |
| 3,970,901 | 7/1976 | Rohr | 361/110 X |
| 3,978,374 | 8/1976 | Rohr | 361/87 X |
| 4,012,669 | 3/1977 | Gelfand et al. | 361/87 X |

FOREIGN PATENT DOCUMENTS 2294571 9/1976 France .

Primary Examiner—Patrick R. Salce
Attorney, Agent, or Firm—Werner W. Kleeman

[57] ABSTRACT

A method of, and apparatus for, detecting fault currents, such as short-circuits in electrical loads, especially at direct-current supply networks, wherein there is produced a current signal corresponding to the load current and compared with a reference value and when a difference signal appearing as a result of such comparison exceeds a threshold value such is employed as a triggering criterion. The rise or slope of the current signal is detected and the reference value is obtained by storing the value of the current signal present upon detection of a predetermined rise.

9 Claims, 2 Drawing Figures

METHOD AND APPARATUS FOR DETECTING FAULT CURRENTS IN ELECTRICAL NETWORKS

BACKGROUND OF THE INVENTION

The present invention relates to a new and improved method of, and apparatus for, detecting fault currents, especially short-circuits, in electrical loads, particularly at direct-current supply lines or networks, wherein there is generated a current signal corresponding to the load current and compared with a reference value and when a difference signal formed as a result of such comparison exceeds a threshold value such is used as a triggering criterion.

The invention can be used to advantage in the transportation field, especially with direct-current or alternating-current operated railways, trolleys, trolleybuses, underground transport systems, such as subways and in other electrical networks. It is known that the indispensable protection of electrical networks against faults, predicated upon fault currents, for instance short-circuits, where the current intensity exceeds a predetermined value, can be accomplished by current-breaking means, such as high-speed circuit breakers. In this regard reference may be made to the publication "la détection des courts-circuits éloignés sur les réseaux de traction électrique à courants continus et alternatifs" by M. P. Branchu, Revue générale de l'électricité, Volume 58, March 1949, page 103 et seq.

However, such process is not employable when the maximum permissible current intensity, during normal operation, exceeds the current intensity produced by a limited short-circuit. For instance, this is the case in an underground transport network where the current intensities prevailing during normal operation can amount to more than ten times the current intensities of the fault currents which are to be detected. If such type short-circuit is not detected, then equipment damage and accidents can arise.

Fault detection can be carried out by analysing the form of the current rise by a difference current-method, a so-called $\Delta I$ protection process. In order to be able to measure $\Delta I$, the input signal must be stored or memorized before the current rise and compared with the input signal after current rise. After this comparison the storage or memory must "catch-up" with the momentary input signal. One possible solution which is used for the measurement of $\Delta I$ consists in the delay of the input signal by an electromechanical element, such as a transformer having a massive magnetic circuit (damping effect) or by means of an electrical element, for instance a circuit have a T-filter. The "catch-up" of the input signal is carried out exponentially. This is disadvantages inasmuch as the $\Delta I$-value which is to be determined if falsified. In fact the "catch-up" starts from the commencement of the the rise of the signal before the latter has reached its new end value. This solution is unfavorable for the detection of remote signals, since their rise likewise is exponential and slower than that of near signals. Therefore, it is necessary to use a large time-constant in order to guarantee good operation. As a result, when signals are superimposed the system is prone to malfunction and there is a risk of unwanted triggering operations.

SUMMARY OF THE INVENTION

Hence, it is a primary object of the present invention to provide a new and improved method of, and apparatus for, detecting fault currents in a manner not associated with the aforementioned drawbacks and limitations of the prior art proposals.

Still another significant object of the present invention aims at avoiding the previously discussed disadvantages and providing a current fault-detection method and apparatus for the performance thereof, by means of which fault currents can be detected at the supply points of an electrical network and there can be initiated opening of the current-interruption means.

Yet a further object of the present invention relates to a method of detecting fault currents in an efficient and reliable manner, without being sensitive to the current shapes prevailing during normal operation.

Now in order to implement these and still further objects of the invention, which will become more readily apparent as the description proceeds, the method aspects of the present development contemplate subjecting the current signal to a detection of its rise or slope, and producing the reference value by storing the value of the current signal which is present during detection of a predetermined rise or slope.

According to a further aspect of the invention the reference value is only memorized or stored during the rise of the current signal, a comparison is made between the current signal and the reference value, and thereafter the momentary value of the current signal is stored as a new reference value.

The advantage of such follow-up and storage process, rendering possible storage of the momentary or instantaneous value of the signal, particularly resides in the fact that the follow-up occurs directly after reaching the $\Delta I$-maximum value. In this way there is afforded optimum protection against brief successive short-circuits.

A preferred constructional manifestation of the invention contemplates permanently carrying out the comparison between the current signal and the reference value and storing the momentary or instantaneous value of the current signal first then for forming the new reference value when the rise or slope of the current signal has reached at least approximately the value null. In this way there can be individually measured sudden rises, whereas in the presence of slow rises there does not occur any $\Delta I$. The follow-up of the reference signal is preferably blocked at the momentary value when there appear other rise signals.

Not only is the invention concerned with the aforementioned method aspects, but also deals with apparatus for the performance thereof comprising circuitry containing the following:

(a) a follow-up circuit, capable of either slowly following a load rise, or storing its momentary input signal value while blocking the follow-up operation and rapidly following-up such with the instantaneous value of the input signal in the event that such rise is completed, and which is capable of rapidly following a rapid drop of the input signal;

(b) a difference signal forming circuit where there is formed the difference signal $\Delta I$ of the signal values at the input side and the output side of the follow-up circuit;

(c) a first threshold value comparator where there is checked whether the difference $\Delta I$ exceeds a minimum threshold value, and which delivers a storage-activation signal upon exceeding the threshold value;

(d) a rise-null detector which detects the at least approximate disappearance of the slope or rise of the current signal and as a function thereof triggers a follow-up signal for the follow-up circuit; and (e) a second threshold value comparator which compares the difference ΔI with a maximum threshold value and upon exceeding such threshold value delivers a trigger signal for interrupting the fault.

One of the major advantages of such circuitry resides, on the one hand, in the reasonable component expenditure, because it does not require any time-delay circuits, and, on the other hand, in the dynamic stability of the system.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
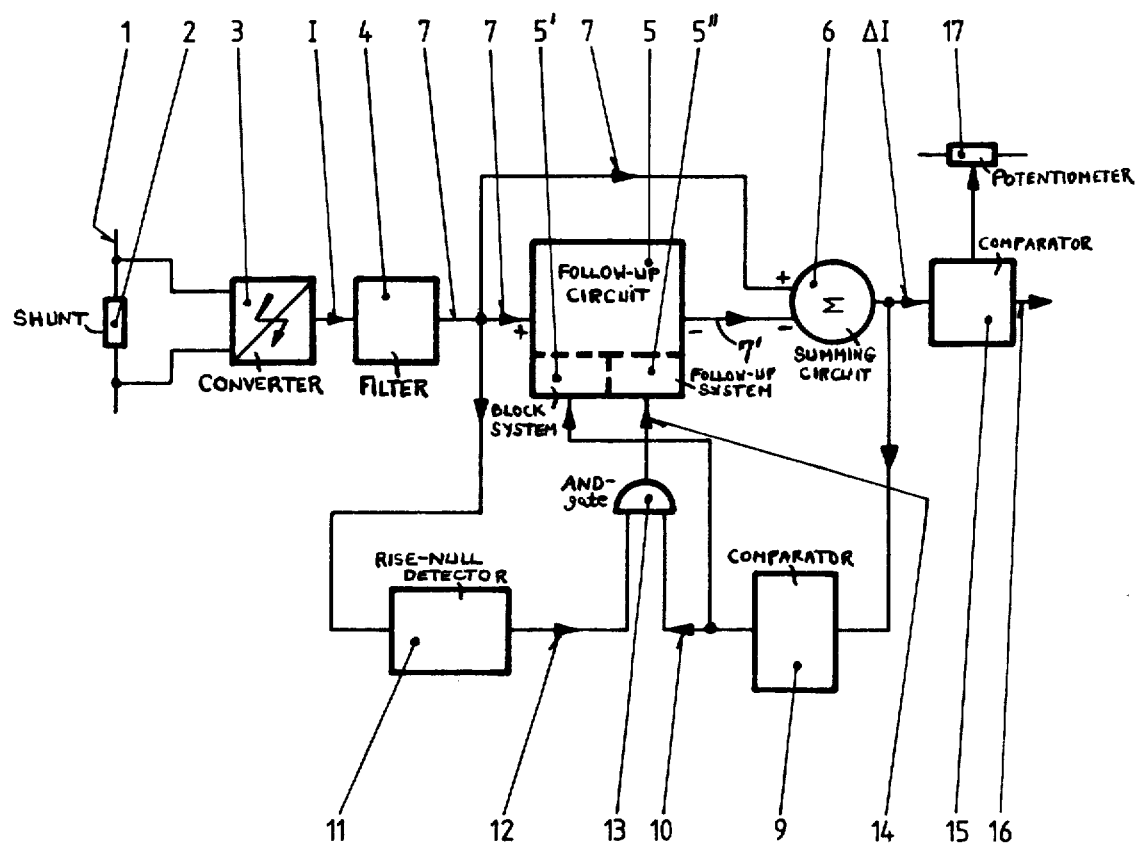
FIG. 1 is a block circuit diagram of a detection circuit constructed according to the teachings of the present invention.

In FIG. 1 there is illustrated the detection circuit for use with a direct-current network. The direction of the processed information is indicated by arrows. A shunt 2 is arranged at the feeder 1 of the electrical line. The voltage which is tapped-off at the shunt 2 is proportional to the current flowing in the line which is not represented. The voltage is applied to a converter 3 which, in the embodiment under discussion, is a direct-current converter which is galvanically insulated and amplifies the voltage. Of course, in the case where the electronic components forming the circuit operate as the potential of the shunt there is not needed any converter. The signal I then passes through a filter 4, which in the illustrated embodiment, is a low-pass filter of 20 Hz. Thus, ripple problems which are present due to the possible use of rectifiers (not shown) are taken care of, without information being lost. The signal at the output side of the filter 4 constitutes the current signal and is applied to the central element of the system, the follow-up circuit 5, which possesses a blocking system 5' and a follow-up or catch-up system 5''. The characteristics of the central element, namely the follow-up circuit 5 are as follows.

(a) slow pursuit or follow-up of the signal during rise: when, for instance, there is used a suitable integrator the output signal can follow a slow current rise.

(b) rapid pursuit or follow-up of the signal during a current drop: if the load is suddenly cut-off then the integrator rapidly decays and is ready to measure a new rise.

(c) blocking of the follow-up operation: this is accomplished by means of an external command, and there is stored the input signal, that is to say, the momentary or instantaneous value of the current signal.

(d) follow-up: by means of a further external command following the blocking or storage command there can be initiated a rapid catch-up or pursuit in such a manner that the input signal I(7) at the input 7 is again identical with the output signal I(7') at the output 7'. There is thus employed a follow-up circuit which memorizes or stores the current signal value prior to the rise process, so that thereafter there can be measured the relative rise amplitude.

As best seen by referring to FIG. 1, the input 7 and output 7' of the follow-up circuit 5 are of inverse polarity. In an adding or summation circuit 6, constituting a difference signal former, there is formed the difference ΔI between the instantaneous value of the current signal I(7) and the delayed (integrator) current signal I(7') at the output 7' of the follow-up circuit 5. This difference signal ΔI is dependent upon the difference between the rise or slope of the current signal I(7) itself and the rise or slope of the output signal I(7') of the follow-up circuit 5, which output signal corresponds to the current signal but in relation thereto is slowed down or delayed. The signal corresponding to ΔI then is applied to a threshold value comparator 9. If the value ΔI exceeds an adjustable, minimum threshold value, a binary signal 10 at the output of the comparator 9 has a value which activates a blocking or storage unit 5' of the follow-up circuit 5. This signal 10 thus serves for the detection of the start of the rise in the event that the current signal ascends more rapidly than the follow-up circuit is capable of follow-up. When the difference between the output signal I(7') at the output 7' and the input signal I(7) at the input 7 of the follow-up circuit 5 has reached the minimum threshold value, the output signal I(7') of the follow-up circuit—i.e., up to a small difference corresponding to the minimum threshold value of comparator 9—is stored as a reference value, this output signal then corresponding to the momentary value of the current signal. If desired, blocking or storage also can be triggered by a different type of rise or slope detector. Furthermore, the current signal I(7) is applied to a rise-null detector 11 i.e., a device for the detection of the rise or slope by means of a differentiation element and an adjustable comparison element. There is preferably employed for this purpose a very accurate and stable device, since the rise of the current signal slowly approaches null. With this detector 11 it is possible to determine for a given signal the point in time when the rise is equal to null. If such value is present, then the detector 11 activates the follow-up of the signal I(7') to I(7), as will be explained more fully hereinafter. Thus, the circuit is again ready to measure the next successive rise.

Hence, each individual rise can be individually measured. Furthermore, the maximum value ΔI can be measured with extreme accuracy.

At the input of the AND-gate 13 there are applied the logical signals 10 and 12. The output signal 14 delivers the follow-up command to the follow-up system 5'' of the integrator of the follow-up circuit 5.

At the end of the circuit there is provided a further threshold value comparator 15, which, upon exceeding a predetermined maximum threshold value, delivers a trigger signal 16 for cutting-off the fault. The threshold value is adjusted by means of a potentiometer 17.

Figure 2:
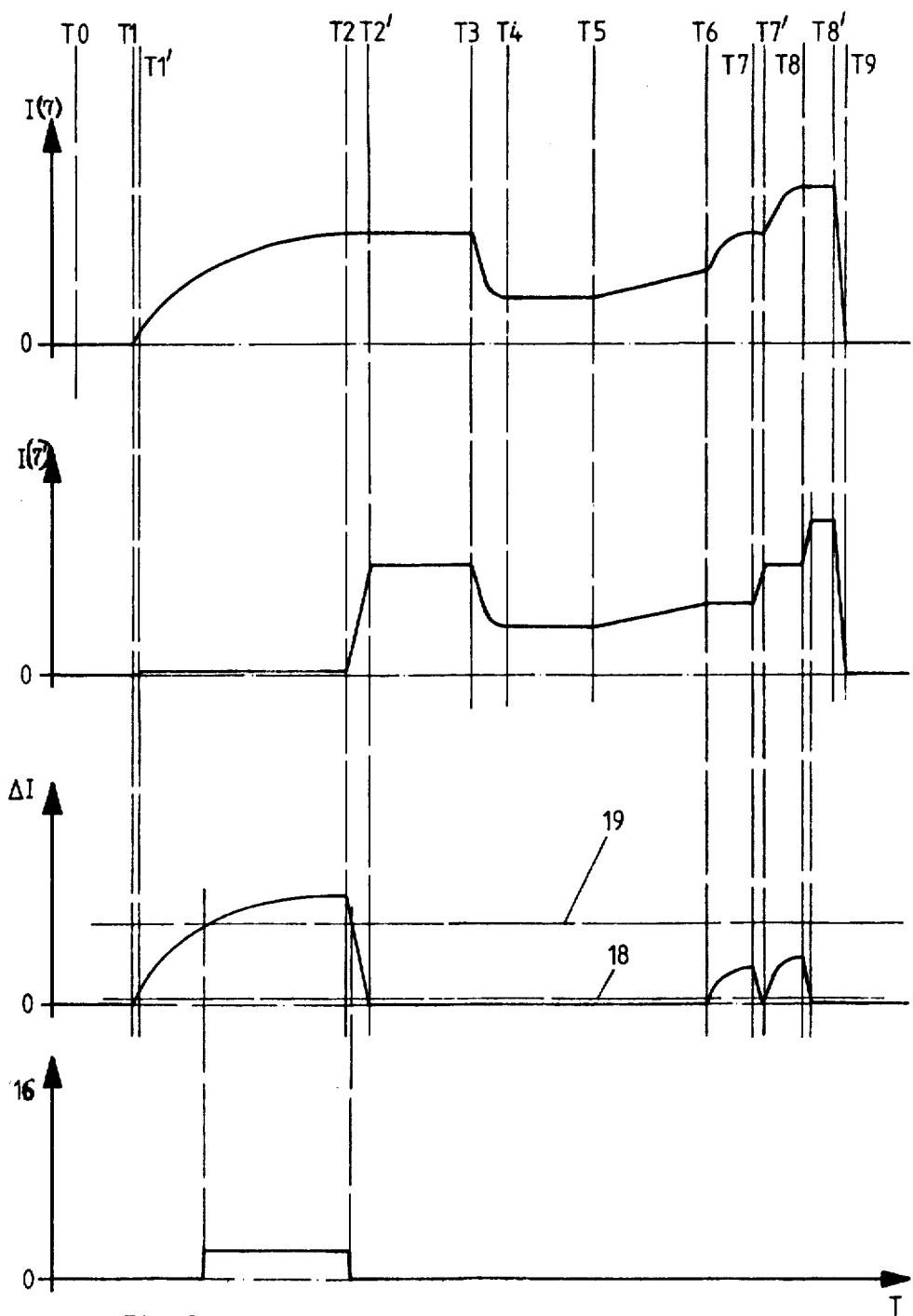
FIG. 2 shows graphs depicting the signals processed and produced by the detection circuit of FIG. 1.

The function of the heretofore described circuit and especially the components 5, 9 and 11 will be explained more fully on the basis of the graphs shown in FIG. 2. The signals I(7), I(7'), ΔI and 16=f(T) in the four graphs schematically show the course of the current signal, the delay or blocked output signal of the follow-up circuit 5 or such output signal which is in the process of follow-up or catch-up, the difference signal, and the trigger signal for the cut-off of the fault, respectively, as a function of time T.

As to the successive points in time there are applicable for the steps of the method the following:

T0: In the example shown, no current initially flows, and thus the corresponding signal I(7) has the value null. The operation would be the same if there was present a base load at the moment T0.

T1: Graph I(7): Start of the current rise originating from a fault, for example, because of a short-circuit in the network. Graph I(7'): The output signal I(7') of the follow-up circuit starts to rise slowly. Graph $\Delta I$: Since the rise in the signal I(7) is much more rapid than the rise of the output signal I(7'), there is obtained a difference $\Delta I$ which exceeds the adjustable minimum threshold value 18 at the time T1'.

T1': Graph I(7'): Exceeding the threshold value 18 causes blocking of the follow-up circuit 5; starting at the time T1' there is stored as the reference value the value of the signal I(7').

T1' to T2: Graph $\Delta I$: The maximum threshold value 19 is exceeded by the signal $\Delta I$. Graph 16: This produces a trigger signal for the not particularly illustrated fault cut-off circuit.

T2: Graph I(7): Point of end of rise of the current. Graph I(7'): There begins the rapid follow-up operation.

T2 to T2': Graph I(7'): The follow-up is carried out within a period of time not exceeding 10 ms. There is preferably chosen 2 ms., so that the circuit is again fully ready to carry out a new measuring operation. Graph $\Delta I$: Since the signal $\Delta I$ is the difference of the input signal I(7) and the output signal I(7'), it falls again to null when the follow-up or catch-up operation has been carried out. In doing this, it crosses the threshold 19 from the top side. Graph $\Delta I$: The threshold value detector 15 is set to null.

T2': When the threshold value 18 is reached, the follow-up or catch-up is stopped. In order to obtain $\Delta I = 0$, the last part of the follow-up is effected by the slow rise device of the follow-up circuit 5; this ensures the stability of the circuit.

T2' to T3: The device is in a preparatory state, as between the times T0 and T1, but with a higher base load.

T3 to T4: Rapid power drop. The output signal of the follow-up circuit 5 follows this drop exactly; as a result $\Delta I = 0$.

T4 to T5: Waiting or preparatory position for another base load.

T5 to T6: Slow rise in the load current. The output signal I(7') of the follow-up circuit 5 follows this rise so rapidly that $\Delta I$ does not reach the threshold value 18 (no blocking and storage).

T6: Start of rise of load current caused by normal operation.

T7: End of rise of the signal I(7).

T6 to T7': The procedure of blocking and that of follow-up or catch-up are the same as that at the time T1 caused by a fault; the blocking operation has not been shown in graph I(7'). Graph $\Delta I$: The threshold value 19 is not reached.

T7': Start of rise of a second load current caused by a normal operation.

T7' to T8': The same process as between the times T6 and T7'. Although the total rise of the signal I(7) between the times T5 and T8 is greater than the rise between the times T1 and T2, the threshold value 19 is not reached; there is no triggering operation. The successive rises of the signals at the times T6 and T7' are produced in practice on account of stepwise loads, for example, when starting a locomotive or a train with several drive cars.

T8' to T9: The signal I(7) rapidly falls again to null, the follow-up circuit 5 faithfully follows the descent; there is no $\Delta I$ signal, and the same situation prevails as between the times T3 and T4.

The invention is clearly not limited to the specific embodiment described and illustrated. For example, a signal I can originate from a shunt which is not located at the feeder output but at the return current. The process and the detection circuit according to the invention are likewise applicable in alternating-current supply networks; it is only necessary to rectify the signal originating from the shunt.

While there are shown and described present preferred embodiments of the invention, it is to be distinctly understood that the invention is not limited thereto, but may be otherwise variously embodied and practiced within the scope of the following claims.

ACCORDINGLY,

What I claim is:

1. A method of detecting fault currents especially short-circuits, in electrical loads, particularly at direct-current lines, comprising the steps of:

producing a current signal corresponding to the load current;

detecting the rise of the current signal;

forming a reference value by storing a value of the current signal which exceeds a predetermined rise during the detection step;

comparing the current signal with the reference value;

forming as a result of the comparison step a difference signal; and using the difference signal as a triggering criterion for eliminating the fault current when the difference signal exceeds a threshold value.

2. A method of detecting fault currents, especially short-circuits in electrical loads, in particular at direct-current lines, comprising the steps of:

producing a current signal corresponding to a load current;

detecting the rise of the current signal;

storing a reference value only during the rise of the current signal;

comparing the current signal with the reference value;

producing a difference signal as a result of such comparison;

using the difference signal as a trigger criterion for cutting-out the fault current when the difference signal exceeds a threshold value; and following the comparison step storing the instantaneous value of the current signal as a new reference value.

3. The method as defined in claim 2, wherein:

comparison of the current signal and reference signal is permanently carried out; and storing of the instantaneous value of the current signal for the formation of the new reference value is first then accomplished when the rise of the current signal has reached at least approximately the value null.

4. The method as defined in claim 3, further including the steps of:

following the first comparison of the current signal with the reference value performing a follow-up of the reference value to the instantaneous course of the current signal within at most 10 ms, in order to avoid undesired triggering operations by superimposed rise signals; and carrying out the renewed storage of the current signal for formation of the new reference value when there is performed a new rise detection.

5. The method as defined in claim 2, further including the steps of:

failing to store the current signal for the formation of the reference value in the presence of a slow rise of the current signal.

6. The method as defined in claim 5, wherein:

storage of the current signal is not accomplished during slow rises of the current signal due to changes of a network base load.

7. The method as defined in claim 2, further including the steps of:

rapidly having the reference value catch-up with the current signal when there occurs a sudden current drop in order to be ready for again measuring the value of the current signal.

8. A detection circuit for determining fault currents, especially short-circuits in electrical loads, especially at direct-current lines, comprising:

means for supplying a load current as an input current signal to a follow-up circuit;

a follow-up circuit having an input side receiving said input current signal and an output side for delivering an output signal;

said follow-up circuit being capable of either slowly following a rise in the load current or storing its instantaneous input signal value while blocking a follow-up operation and rapidly following-up the instantaneous value of the input signal if the rise thereof has been completed, said follow-up circuit being capable of rapidly following a rapid decrease of the input current signal;

a difference signal forming circuit for forming a difference $\Delta I$ between the values of the input and output signals of the follow-up circuit;

a first threshold value comparator for checking whether the difference $\Delta I$ exceeds a minimum threshold value;

said first threshold value comparator delivering a storage-activation signal upon exceeding the threshold value;

a rise-null detector which detects at least the approximate disappearance of the rise of the input current signal and as a function thereof triggering a follow-up operation of the follow-up circuit; and a second threshold value comparator for comparing the difference $\Delta I$ with a maximum threshold value and upon exceeding the maximum threshold value delivering a trigger signal for cutting-out the fault.

9. The circuit as defined in claim 8, wherein:

said means for supplying the current signal comprises a galvanically insulated direct-current converter.

* * * * *